THE DISTRIBUTED COMPUTER

INVENTOR
S. H. UNGER
BY Alan C. Rose
ATTORNEY

INVENTOR
S. H. UNGER
BY Alan C. Rose
ATTORNEY

Oct. 8, 1963 S. H. UNGER 3,106,698

PARALLEL DATA PROCESSING APPARATUS

Filed April 25, 1958 6 Sheets-Sheet 3

INVENTOR
S. H. UNGER

BY Alan C. Rose

ATTORNEY

PARALLEL DATA PROCESSING APPARATUS

Filed April 25, 1958 6 Sheets-Sheet 4

INVENTOR
S. H. UNGER
BY Alan C. Rose
ATTORNEY

Oct. 8, 1963 S. H. UNGER 3,106,698

PARALLEL DATA PROCESSING APPARATUS

Filed April 25, 1958 6 Sheets-Sheet 5

INVENTOR
S. H. UNGER
BY Alan C. Rose
ATTORNEY

INVENTOR
S. H. UNGER
BY Alan C. Rose
ATTORNEY

United States Patent Office 3,106,698

Patented Oct. 8, 1963

3,106,698
PARALLEL DATA PROCESSING APPARATUS

Stephen H. Unger, Morristown, N.J., assignor to Bell Telephone Laboratories, Incorporated, New York, N.Y., a corporation of New York Filed Apr. 25, 1958, Ser. No. 730,856
7 Claims. (Cl. 340—172.5)

This invention relates to data processing apparatus, and more particularly to a parallel data processing apparatus for operating simultaneously on large amounts of related input information.

Digital computing and data processing apparatus characteristically operate on input information on a digit-by-digit, or "bit-by-bit" basis. Although some computers have parallel type arithmetic units which operate on all of the digits of a single number simultaneously, the extent of the parallel action is normally just sufficient to perform the usual "bit-by-bit" computing operations at a slightly higher rate.

Certain types of problems in which large quantities of related information must be correlated are not readily adapted to solution by conventional digital computers. "Spatial" problems such as chess playing and pattern recognition are typical of this type of problem. In these areas, present day digital computers have not been able to match the performance of their designers.

Accordingly, a general object of the present invention is an improved computer for the processing and the solution of "spatial" problems.

The problem or difficulty with the present day digital computers is that these machines can actively cope with only a small amount of information at any one time whereas the solution of spatial problems, such as the recognition of specific patterns, is most advantageously performed by the processing of a great deal of information simultaneously. In one specific illustrative embodiment of my invention this simultaneous operation on information is attained by providing an array of distinct but identical computer modules which are interconnected so that information can be switched or transferred between a specific module and its immediately adjacent modules. A single control or master circuit programs and coordinates the operations of these distinct modules. Inputs to any one module may come from the master control and from a storage portion of the modules adjacent the particular module, i.e., the modules which may be physically above, below, to the left, and to the right of the particular module. An input signal may also be fed directly to each module storage portion from outside the machine. The master control, in accordance with my invention, does not, in general, address the modules individually but issues general orders which go to all of the modules.

Further in this specific illustrative embodiment of my invention each module comprises the storage portion referred to above which may be designated an accumulator, a certain amount of memory, and some associated logic. The memory portions are arranged identically in all the modules so that control orders may be addressed to the same memory area or element in each of the modules simultaneously. In this way the modules may be operated simultaneously for the efficient solution of spatial problems.

The modules, in this specific illustrative embodiment, may be interconnected, as described above, both directly and by link circuits. These link circuits include storage for the registration of information regarding the states of the modules they interconnect. The link circuits may also be logically controlled by the master control circuits. In this manner information transfer between identical adjacent modules may be logically controlled in accordance with the previous states of the adjacent modules as registered in the link circuits.

In accordance with a feature of the invention, a digital data processing circuit is provided with an array of computer modules each of which includes storage and logic circuitry. Individual sources of input information may be coupled respectively to each of the modules, and the data processing circuit may also include a central control circuit for applying common logical control and storage orders to the computer modules.

In accordance with another feature of the invention, a spatially oriented data processing system is provided, in which the respective signal inputs to the modules mentioned in the preceding paragraph are derived from sources in spaced physical locations, with the relative positions of the input sources corresponding respectively to the positions of the associated modules in the array.

In accordance with an additional feature of the invention, each module in an array of modules includes a register, input circuitry is provided to introduce a pattern of registrations into the array, each module is connected to at least three adjacent modules, and control circuitry is provided for shifting the pattern of registrations in the array in at least two different directions.

Other objects and various advantages and features of the invention will become apparent by reference to the following description taken in connection with the appended claims and the accompanying drawing forming a part thereof.

Figure 5:
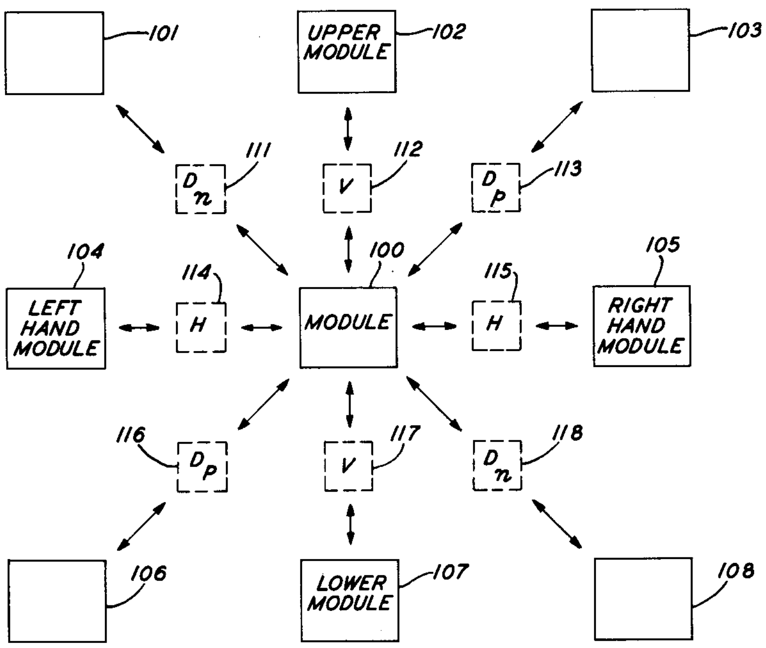
Figure 6:
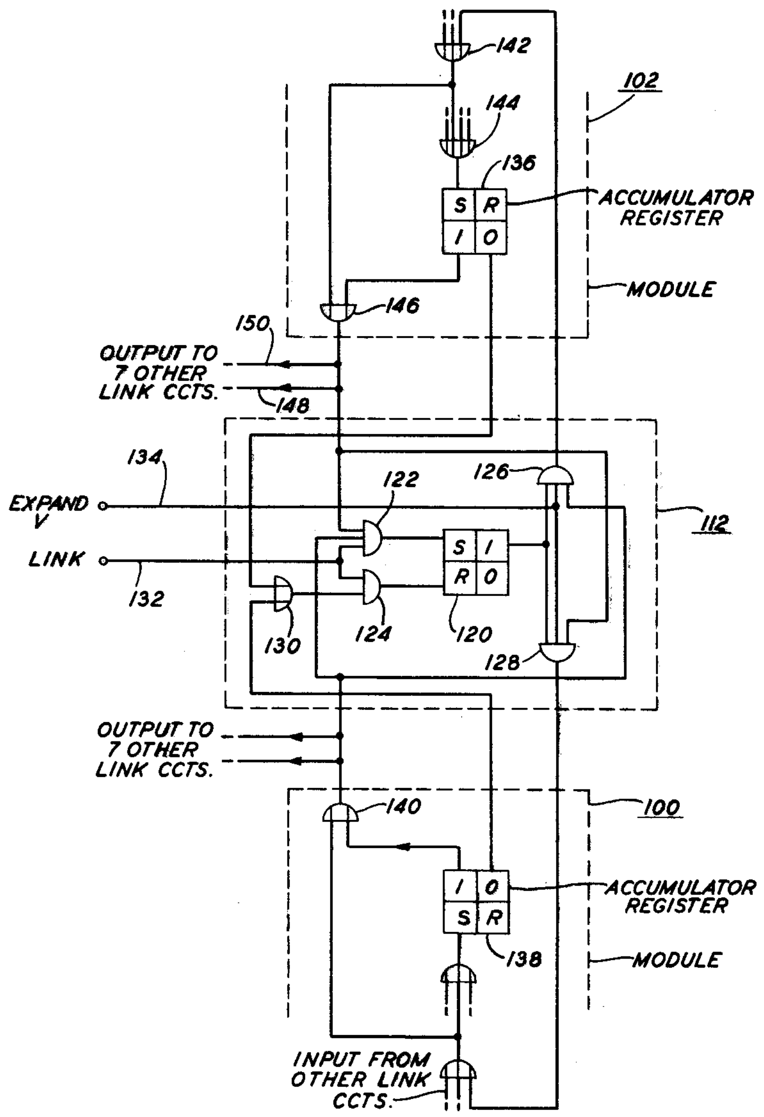

FIG. 5 indicates diagrammatically the coupling of a module through link connecting circuits with adjacent modules;

FIG. 6 is a logic circuit diagram of one of the link circuits shown in FIG. 5; and FIGS. 7, 8, 9, and 10 are diagrams indicating computer program steps utilizing link circuits.

Figure 1:
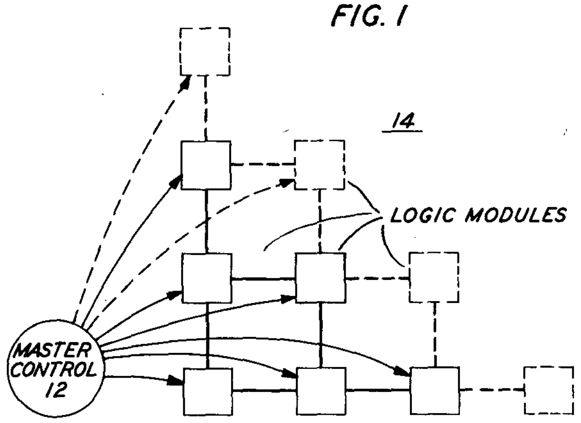
FIG. 1 is a conceptual block diagram of the distributed computer in accordance with the present invention.

With reference to the drawing, FIG. 1 shows the distributed computer arrangements in accordance with the present invention. More specifically, the present computer includes a master control circuit 12 and an array 14 of logical modules. In the operation of the computer, individual sources of binary input information are connected respectively to supply signals to the individual logic modules. As mentioned above, each module includes a few bits of storage and circuitry for performing the basic logic operations. Under the control of the master control circuit 12, logic operations are performed upon the input digital signals supplied to the logic modules. Each logic module is connected to the modules which adjoin it. Each module may therefore utilize information received directly from associated modules in a manner to be discussed in detail below.

Figure 2:
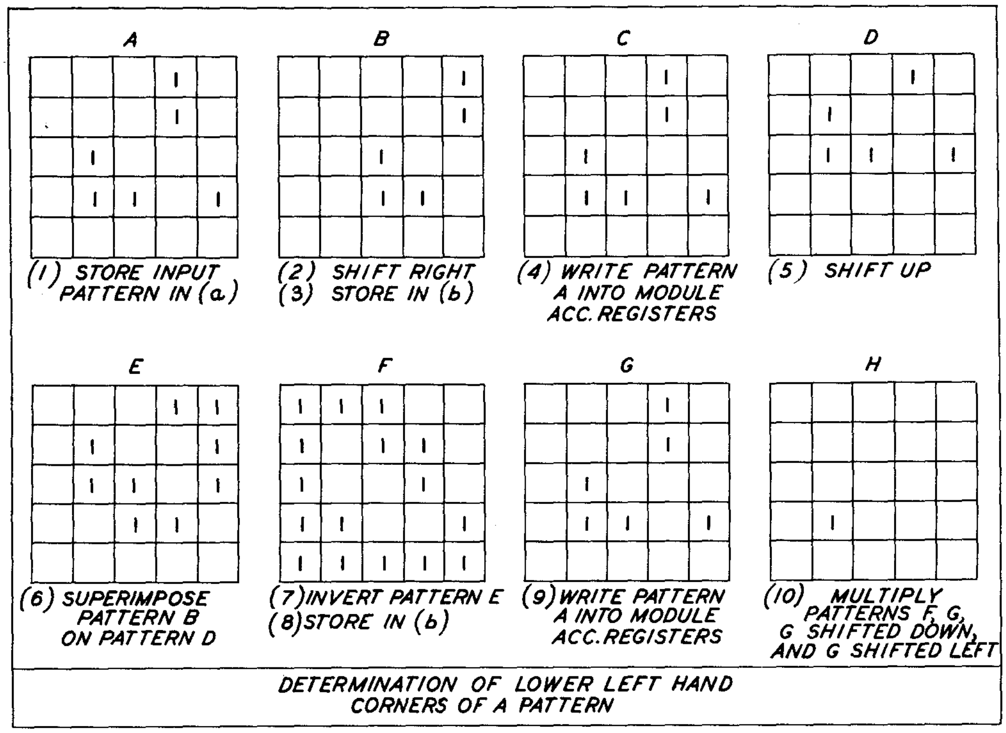
FIG. 2 is a diagram indicating the successive steps which would be performed by the present computer in the identification of a simple pattern.

Before considering the detailed circuitry of the proposed computer, a simple example of the mode of operation of the computer will now be considered in connection with FIG. 2. In FIG. 2, each of the eight blocks represents the array of logic modules and indicates the binary state of one of the registers included in each module. Incidentally, each module includes a principal register which is designated the accumulator register, and several additional single-bit storage registers, which are designated by the letters *a*, *b*, and so forth. Control signals from the master control circuit 12 of FIG. 1 are applied to all of the computer modules simultaneously to effect desired logic, storage, or shifting operations in the individual modules.

In connection with the diagrams of FIG. 2, a group of 25 modules in a 5×5 array will be considered. In FIG. 2, the eight representations of this 5×5 array are designated by the letters A through H. The initial input state of the array is shown in block A. Incidentally, the energization of a storage register associated with each module is represented by the presence of a "1" in the space corresponding to the individual module. The absence of a "1" in the space corresponding to a given module indicates that the register in question is in the de-energized, or "0" state.

The steps set forth in connection with the diagrams of FIG. 2 are designed to locate lower left-hand corners of the initial pattern stored in the array of logic modules. A lower left-hand corner is defined as that portion of a figure in which an energized module has an energized module above and another energized module to the right, and has de-energized modules both below and to the left. Only one such point appears in the original pattern shown in block A of FIG. 2.

The initial step of the program is to store the input pattern in storage register (*a*) associated with each module. The second step in the program involves a shifting of the original pattern to the right. This is followed by the storage of the resulting pattern in register (*b*) of each of the modules, as shown in block B of FIG. 2. Step 4 involves the writing of pattern A from register (*a*) into the module accumulator register. Pattern C is therefore a reproduction of pattern A. The fifth step is an upward shifting of this pattern analogous to the right shift of step 2. In accordance with step 6 and block E of FIG. 2, pattern B from register (*b*) of each module is superimposed on the pattern shown in block D. In steps 7 and 8, the pattern shown in block E is inverted and stored in register (*b*). In the inversion operation, "1's" are replaced by "0's," and "0's" are replaced by "1's." At this point there will be a "1" in the (*b*) registers for only those modules which had de-energized modules below and to the left in the original field. In accordance with step 9, the original pattern from each module register (*a*) is written into the accumulator registers. Step 10 requires the logical multiplication (point-by-point) of the pattern in block G by pattern F, the pattern of block G shifted one unit to the left, and the same pattern of block G shifted one unit down. It may be recalled that pattern F was previously stored in register (*b*) of each module. In addition, and as will be explained below, the patterns shifted by one unit vertically or horizontally are immediately available from adjacent modules. The operation may therefore be accomplished in one operation as indicated by the composite step 10 set forth under pattern H of FIG. 2. The single lower left-hand corner of original pattern A is now identified by the single "1" in the pattern of block H.

In FIG. 2, one simple pattern recognition problem has been solved. With much larger arrays of modules and more complex programs, the recognition of other patterns of letters and other symbols may be readily accomplished.

Figure 3:
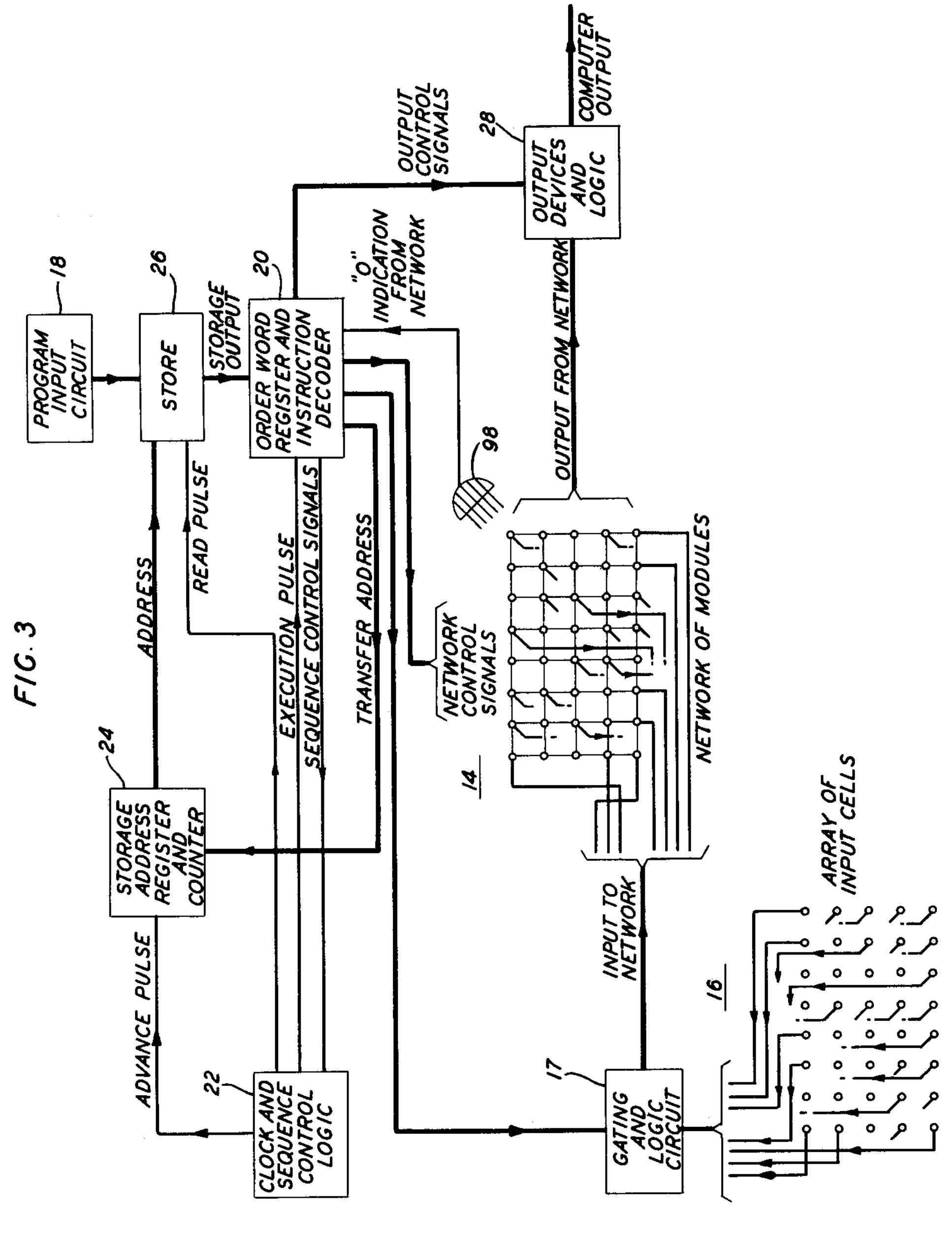
FIG. 3 is a more detailed block diagram of a computer system in accordance with the invention.

Now that the example of FIG. 2 has been considered, the circuitry for implementing the over-all system and the individual modules will be discussed. In FIG. 3, the array 14 of modules may receive input information signals from a corresponding array 16 of input devices under the control of the gating and logic circuit 17. Program sequences from the input circuit 18 are applied to the central storage circuit 26. Each of the programs is stored in a separate group of consecutive address registers in the store 26. The counter in circuit 24 is initially set to the first address of one of the groups of consecutive registers containing a program. When this address signal is transmitted to the store 26 and a read pulse is received from timing circuit 22, output signals are applied to the order word register and instruction decoder circuit 20 to specify the first step of the program. Upon the receipt of an execution pulse from the clock and sequence control logic circuit 22, network control signals are applied by circuit 20 to the array 14 of modules. The module then executes the order. Next, an advance pulse is applied to storage address circuit 24, and the counter is stepped to the next successive address. The corresponding register in store 26 contains the next step of the program information, and this information is supplied to the order word register circuit 20. Upon the application of the next successive execution pulse, appropriate signals are applied to the array 14 of modules.

At the end of a given program, the computer is normally transferred to another sequence of program steps. In the case of an unconditional transfer to a specified new address, the new address appears as the final step in the previous program. When the transfer signal and transfer address are applied to the circuit 20, the address is transferred directly from circuit 20 to set the counter in circuit 24 to the new address. In addition, a sequence control signal is applied to circuit 22 to inhibit the advance pulse during this cycle of the operation of the computer. Following the transfer operation, the counter in circuit 24 is stepped forward sequentially to read out the instructions in the new group of registers in the store 26 which define the steps of the new program.

Upon the completion of each program, output signals from the network 14 of modules and from the circuit 20 may be applied to the output circuit 28. The circuit 28 includes output devices and the necessary logic and buffering circuits for applying signals in a desired form to the computer output leads.

The circuits included in the common control portion of the computer shown in FIG. 3 are generally conventional. The individual functions performed by these circuits are well known in the digital computer art, and the circuits may be implemented in accordance with any known technology.

Figure 4:
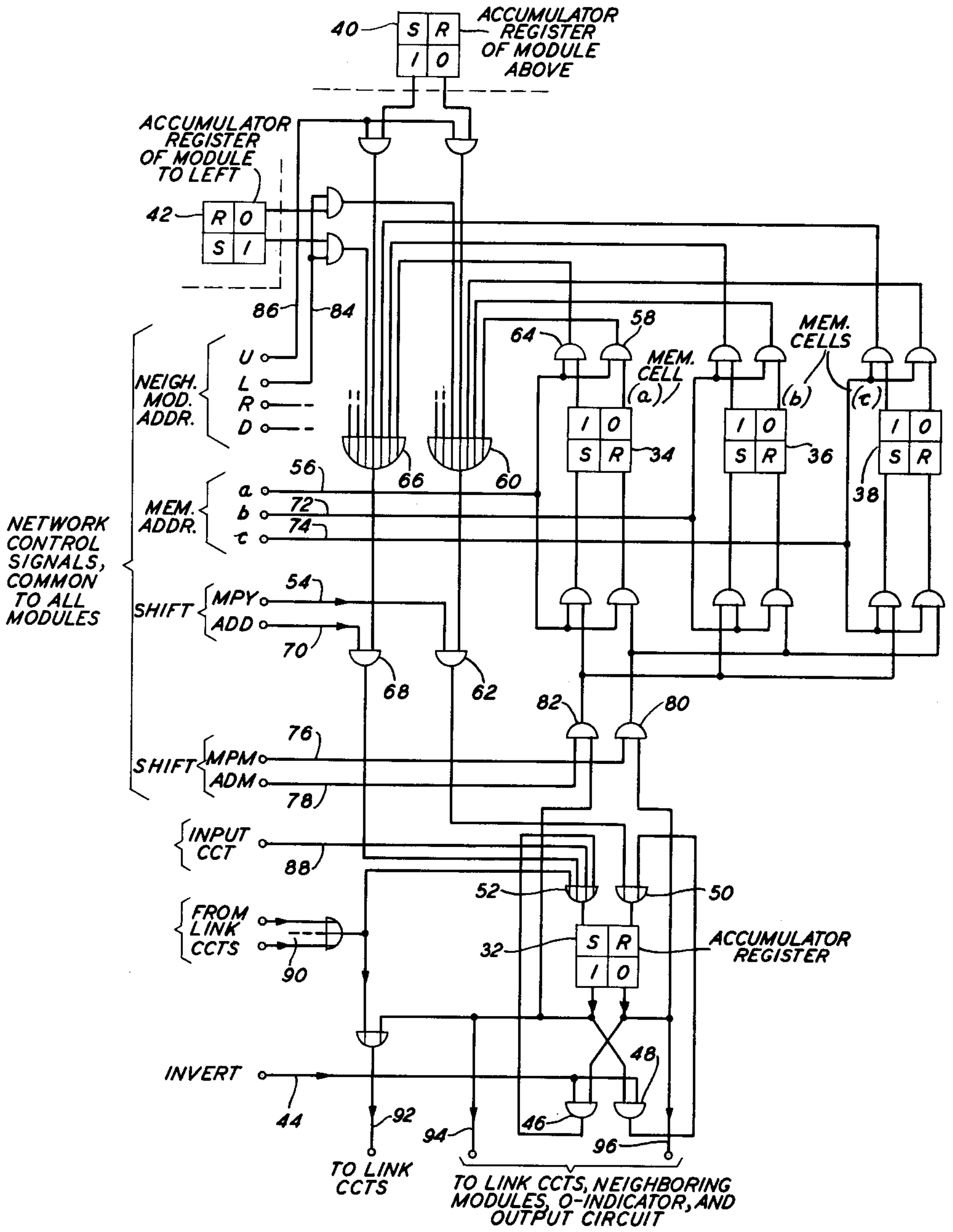
FIG. 4 is a logic circuit diagram of one module which may be employed in the circuit of FIG. 3.

FIG. 4 is a logic circuit diagram of one module included in the array 14 of FIGS. 1 and 3. Each module includes several binary memory cells. In FIG. 4, the accumulator register or memory cell is shown at 32. The additional registers 34, 36, and 38 are also designated (*a*), (*b*), and (*c*), respectively, for the purposes of program control orders. In the circuit of FIG. 4, the accumulator registers 40 and 42 of the logic modules above and to the left, respectively, of the module shown in detail in FIG. 4 are also included.

The accumulator register 32 and its associated logic circuits are capable of performing logic and simple "arithmetic" functions. These functions include adding or multiplying in accordance with the principles of Boolean algebra. More specifically, a multiplication in Boolean algebraic terms is similar to normal multiplication; that is, a product of a "0" and a "1" is a "0," and the product of two "1's" is a "1." However, in Boolean algebraic addition, the sum of a "1" and a "0" or two "1's" is equal to "1." In order to produce a "0" sum, both the addend and the augend must be equal to "0."

The module of FIG. 4 includes a number of AND gates and OR gates for the processing of binary signals. In FIG. 4, AND gates are represented by a semicircle with the inputs stopping at the diameter of the semicircle. OR gates are also represented by a semicircle; however, the input leads pass through the diameter to the outer edge of the semicircle. Circuitry for implementing AND and OR gates as well as registers is well known in the art at the present time. Typical circuits for performing these logic functions are disclosed in a text entitled "The Design of Switching Circuits" by W. Keister, A. E. Ritchie, and S. H. Washburn, D. Van Nostrand Company, Inc., New York, 1951, and "Principles of Transistor Circuits," edited by Richard F. Shea, John Wiley and Sons, Inc., New York, 1953.

Various operations which may be performed by the module shown in FIG. 4 will now be considered. It is again noted that the accumulator register 32 is the central element of the module, and most functions necessarily include the transmission of information to or from this register. One simple order which was used in the course of the explanation of FIG. 2 is the "invert" order. The invert input lead 44 from the control circuit 20 of FIG. 3 is connected to one input of each of the AND gates 46 and 48 in FIG. 4. The AND gates 46 and 48 are located in the circuits interconnecting the output of one portion of the register 32 with the input of the other portion of the register. Thus, the register 32 may be considered to be a bistable multivibrator with set and reset input leads and "1" and "0" output leads. When the set input lead has been energized, the "1" output lead is energized. Similarly, when the reset input lead has been energized, the '0" output of the register is energized. Thus, assuming that the register 32 is in the "1" state, upon the occurrence of an invert order on lead 44 a signal is transmitted through the AND gate 48 and the OR gate 50 to the reset input of the register 32. Similarly, if the register 32 is in the "0" state at the time of the occurrence of an invert order, a signal is transmitted through AND gate 46 and the OR circuit 52 to set the register 32 to the "1" state. Thus, in either case the application of an invert order reverses the state of the accumulator register 32.

The operation of the module of FIG. 4 when it is desired to multiply two pairs of stored digits will now be considered. For example, the multiplication of the digit stored in register 34 and that stored in the accumulator register 32 will be considered. To accomplish this function, the multiply lead 54 and the memory lead 56 are energized by pulses from the order word register circuit 20 of FIG. 3. The energization of memory lead 56 opens the AND gate 58 and permits the transmission of a signal from the "0" side of multivibrator 34 through the OR circuit 60 to the AND gate 62. The signal on lead 54 opens the AND gate 62 and permits the application of a signal through the OR gate 50 to the reset side of the accumulator multivibrator 32. Thus, if the register 34 has been in the "0" state, the accumulator register 32 is set to the "0" state. Of course, if the accumulator register 32 is already in the "0" state, the presence of a "1" in register 34 cannot change its state. This conclusion may be checked by tracing the circuit from the "1" side of register 34 through the AND gate 64, the OR circuit 66, to the AND gate 68. In the absence of a pulse on the "add" input lead 70, the pulse is blocked at the AND circuit 68 and cannot reach the OR circuit 52 or the set input to the accumulator register 32.

When it is desired to add the contents of a register, such as register 34, to the contents of the accumulator register 32, however, the add input lead 70 is energized. Under these circumstances, it is evident that the accumulator 32 will be set to the "1" state if either of the registers 32 or 34 was initially in the "1" state. In this regard, it may be noted that the absence of a multiply signal on lead 54 precludes the transmission of signals from the "0" output of register 34 to the reset input of register 32.

When it is desired to shift or transfer the contents of register 34 into the accumulator 32, both the multiply input lead 54 and the add input lead 70 are energized, in combination with the memory input lead 56. Under these circumstances, the "1" and "0" output signals from register 34 are coupled directly to the set and reset inputs of the accumulator register 32 and the accumulator register assumes the state of the storage register 34.

Signals from the storage registers 36 or 38 may be utilized in much the same manner as the signals from the register 34. When it is desired to select the registers ($b$) or ($c$), the memory input leads 72 or 74, respectively, are energized instead of the memory input lead 56. Either or both of the multiply and add input leads 54 and 70 are also energized to accomplish the desired multiplication, addition, or transfer operations.

Circuitry is also provided for multiplication, addition, or shifting numbers in a storage register and in the accumulator register and leaving the result in the storage register. These operations are accomplished through the energization of either or both of the "multiply-to-memory" lead 76 and the "add-to-memory" lead 78. In addition, the selected memory address lead 56, 72, or 74 must be selected. For the purpose of these operations, the AND circuits 80 and 82 perform the same function as the AND circuits 62 and 68. In other respects, the operations are substantially the same as those described above in which the result is to be left in the accumulator register. In addition to the signals available in the storage registers 34, 36, and 38, signals are also available from the neighboring modules. Thus, for example, the signals from the accumulator register 42 may be obtained by energization of lead 84, and signals from the accumulator register 40 of the upper module may be obtained by energizing lead 86 instead of one of the memory leads 56, 72, or 74.

The input circuit 88 from one cell of the array of input devices broadly designated 16 in FIG. 3 is coupled to the set input of the accumulator register 32. Prior to the introduction of signals on input lead 88, however, each register in the array of accumulator registers is set to the "0" state in a manner to be discussed below.

In FIG. 4, the input lead 90 and the output leads 92 are connected to the link circuits. These link circuits will be considered in some detail in the immediately following paragraphs. Leads 94 and 96 from the output of the accumulator register 32 are connected to the link circuits, to neighboring modules, and to the "0" indicator circuit 98 and the output circuit 28 of FIG. 3.

Now that the over-all organization of the computer has been indicated and the circuitry of an individual module described, the order structure of the computer will be considered. As discussed above, the master control circuitry includes a random access store, a clock or master timing circuit, and a decoding circuit. It operates in a manner similar to that of the operation decoding section of a conventional digital computer, reading out instructions from the store 26 in sequence, decoding these instructions, and sending the appropriate control voltages on a set of busses coupled to each of the modules in the network 14 of FIG. 3. A logic adder 98 (constituting an OR gate) in FIG. 3 has an input from the accumulator register of each module of the network 14. It provides an indication to the master control circuitry when all of the accumulator registers are in the "0" state, and thereby makes possible a "transfer on zero" order. This instruction is analogous to the conditional transfer orders employed in ordinary digital computers, and tells the master control to skip to the instruction addressed by the "transfer on zero" order if there are no "1's" in any of the module accumulator registers. The conditional transfer order is carried out in a manner similar to the unconditional transfer order (tr $x$) discussed above. Upon the execution of either of the transfer orders the application of a sequence control signal to clock circuit 22 inhibits the next advance pulse, and the counter in circuit 24 is set to the new address. This is in contrast to the normal execution of successive orders in a sequence under the control of circuit 22.

In the following Table I, the orders which may be employed in the present computer and which have been considered up to the present time are tabulated. In addition, the shorthand expressions or abbreviations for each order are listed for convenience in designating computer programs.

TABLE 1

| Order | Abbreviation | Meaning |
|---|---|---|
| Transfer to instruction *x*. | tr *x* | Execute instruction *x* next. |
| Transfer on zero to instruction *x*. | trz *x* | Execute instruction *x* next if there are no "1's" in the field. Otherwise continue in the normal sequence. |
| Invert | in | Change the contents of all the accumulators. |
| Add | add | Add logically to the contents of the accumulator the contents of the specified memory cells and neighboring accumulators. Leave memory cell contents unchanged. |
| Multiply | mpy | Multiply logically the contents of the accumulator and the specified memory cells and adjacent accumulators. Result is placed in accumulator and memory cell contents are left alone. |
| Add in memory | adm | Add logically to the contents of each of the specified memory cells the contents of the accumulator. Do not change accumulator contents. |
| Multiply in memory | mpm | Multiply logically the contents of each specified memory cell by the contents of the accumulator without disturbing the accumulator. |
| Store | st | Store the accumulator contents in each of the specified memory cells without disturbing the accumulator. |
| Write | wr | Write the contents of the indicated memory cell into the the accumulator without altering the contents of the memory cell. |
| Shift left (or right or up or down). | sL (sR, sU, sD). | Write the contents of each accumulator into the accumulator to the left (or right or above or below). |

To indicate the use of the order structure set forth above, the ten successive steps considered in connection with the eight lettered blocks of FIG. 2 will now be set forth in the abridged computer program notation.

TABLE II

*Program for Determination of Lower Left-Hand Corners of a Pattern*

| Program | Notation | Translation |
|---|---|---|
| 1 | st *a* | Store signal from accumulator register in register (*a*). |
| 2 | sR | Shift the signal in each accumulator register one module to the right. |
| 3 | st *b* | Store in register (b). |
| 4 | wr *a* | Write signal from register (a) into the accumulator register. |
| 5 | sU | Shift up. |
| 6 | add *b* | Add signal in register (b) to the signal in the accumulator register. |
| 7 | in | Invert. |
| 8 | st *b* | Store in register (b). |
| 9 | wr *a* | Write signal from (a) into accumulator register. |
| 10 | mpy, *b*, U, R | Multiply accumulator register signal by signal from register (*b*), and by the signals in accumulator registers of modules above and to the right. |

In connection with Table II, it may be noted that each order refers implicity to the accumulator register. Following a description of certain additional circuits of the computer, other orders will be considered.

FIG. 5 is a diagram of a module 100, the immediately adjacent modules 101 through 108, and the link circuits 111 through 118 connecting the module 100 with the respective modules 101 through 108. The link circuits interconnect each module with the adjacent modules to permit the use of expansion routines. Thus, for example, an expansion order may be employed to indicate all points in a predetermined pattern which are connected to a selected point in the pattern. The use of link-expand orders is considered in detail below in connection with FIGS. 7 through 10 in which diagrams of several representative examples are set forth.

FIG. 6 indicates the details of a vertical link circuit such as those shown at 112 and 117 in FIG. 5. In FIG. 6, the link circuit per se includes the bistable multivibrator 120 and the four AND gates 122, 124, 126, and 128. In addition, the link logic circuitry includes the OR circuit 130. The steps required in carrying out an expansion routine in the computer steps involve an initial link order supplied on lead 132 and a subsequent expand order applied on lead 134. In passing, it may be noted that the expand orders may be applied to vertical, horizontal, positive diagonal, and negative diagonal link circuits either individually or in combination.

The application of a link order signal to the link circuits energizes the registers of those link circuits which are connected between modules both of which have accumulator registers set to the "1" state. Thus, with reference to FIG. 6, the application of a link order on lead 132 energizes AND circuits 122 and 124. If both the accumulator register 136 and the accumulator register 138 in the modules 102 and 100, respectively, are set to the "1" state, the remaining two inputs of the AND gate 122 are enabled and the register 120 is set to the "1" state. Otherwise, AND gate 124 will be energized and register 120 will be reset to the "0" state.

Now, at some later point in the program the accumulator register 138 of module 100 may be set to the "1" state, while the accumulator register 136 of module 102 is in the "0" state. In view of the earlier link order, the register 120 of the link circuit 112 is still set to the "1" state. The application of an expand signal to lead 134 has the effect of setting accumulator register 136 to the "1" state. This is accomplished by the coincidence circuit 126 coupling signals from the "1" outputs of registers 120 and 138 to the set input of accumulator register 136. Thus, the expand signal is connected to one input of the AND circuit 126, the "1" output of accumulator register 138 is connected through the OR gate 140 to another input of the AND gate 126, and the "1" output of register 120 is connected to the third input of AND gate 126. The resulting signal at the output of AND gate 126 is applied through the OR circuits 142 and 144 to set accumulator register 136 in module 102 to the "1" state. To avoid delays inherent in setting the register 136 to the new state, the OR circuit 146 is provided to bypass link signals from OR circuit 142 around the register 136. Thus, the linking signals may be propagated through OR circuit 146 along the leads 148, 150, and so forth to additional modules.

In connection with FIGS. 5 and 6, the link circuits interconnecting adjacent modules have been described. It should be noted, however, in considering the detailed module circuit of FIG. 4 and the link circuits of FIGS. 5 and 6, that all of the connections are not shown in each case. Thus, for example, in FIG. 4 the link circuits and the link circuit connections from accumulator registers 40 and 42 are not shown, and in FIG. 6 the direct connections between modules 100 and 102 are not shown. These connections were omitted to simplify the individual figures and the description of the individual functions. In passing, it may be noted that adjacent modules are interconnected both directly and through link circuits. Now that the link circuits have been described, an example of the use of link and expand orders will be set forth.

Figure 7:
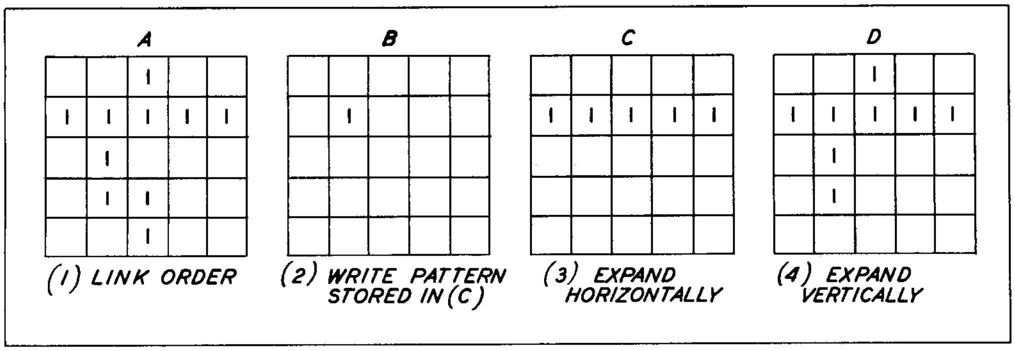

In FIG. 7, pattern A is initially stored in the accumulator registers of an array 14 of modules. In accordance with the step 1 indicated in FIG. 7, a link order is applied to the array of modules. In accordance with step 2 the pattern stored in registers (*c*) of the modules is written into the accumulator registers of the modules. As indicated in block B of FIG. 7, only a single accumulator register is set to the "1" state. Step 3 indicated in FIG. 7 calls for expansion in the horizontal direction. The resulting pattern, as shown in block C of FIG. 7, is a complete row of "1's" extending horizontally in both directions from the enrgized accumulator register shown in block B of FIG. 7. It may be noted that the horizontal link circuits interconnecting each of the modules shown energized in block C of FIG. 7 were energized by the original link order.

The fourth step indicated in FIG. 7 calls for expansion in the vertical direction. Block D in FIG. 7 shows the result of vertical expansion of the pattern of block A from the row of energized modules indicated in block C. For clarity of explanation, steps 3 and 4 calling for horizontal and vertical expansion were considered separately. In this regard, it may be noted that both the horizontal and vertical link circuits may be energized simultaneously; under these circumstances the entire pattern of block A of FIG. 7 would be reproduced.

The four steps shown in FIG. 7 may be written in computer shorthand language as the following four orders:

(1) link
(2) wr *c*
(3) exp H
(4) exp V

These four steps correspond exactly to the four steps written out in greater detail on FIG. 7.

Figure 8:
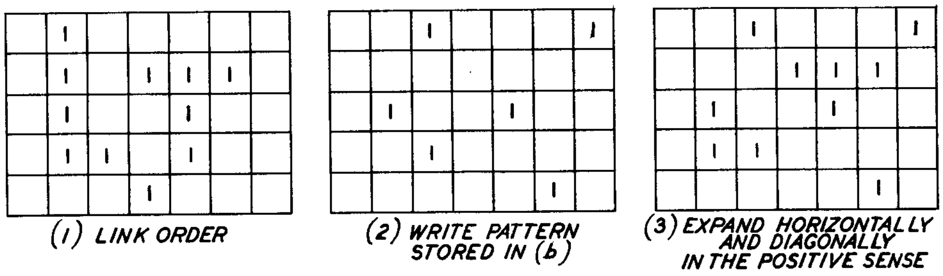
Figure 9:
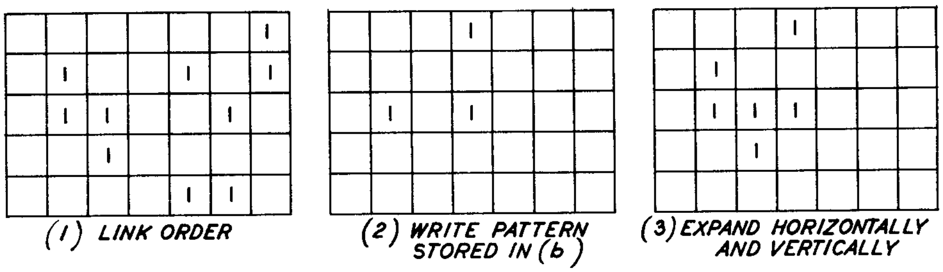
Figure 10:
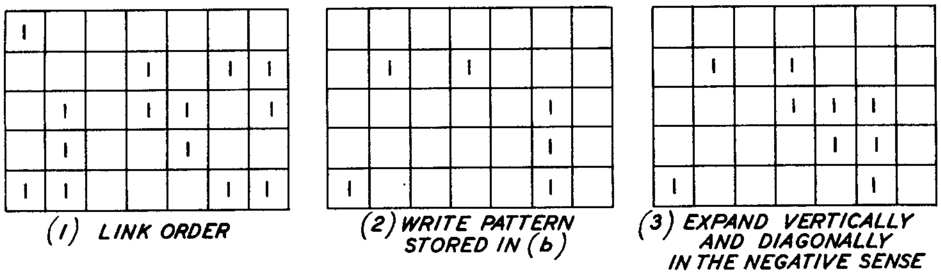

FIGS. 8, 9, and 10 show diagrammatically link-expand orders of various other types. Thus, for example, the three blocks of FIG. 8 show expansion simultaneously in the horizontal and positive diagonal directions, the blocks of FIG. 9 show expansion simultaneously in the horizontal and vertical directions, and the three blocks of FIG. 10 illustrate expansion in the vertical and negative diagonal directions. The shorthand notations for the sets of orders shown in FIGS. 8, 9, and 10 are as follows.

| Fig. 8 | Fig. 9 | Fig. 10 |
|---|---|---|
| (1) link.<br>(2) wr *b*.<br>(3) exp HDp. | (1) link.<br>(2) wr *b*.<br>(3) exp HV. | (1) link.<br>(2) wr *b*.<br>(3)exp VDn. |

A simple technique for clearing the array of modules involves the successive orders of (1) write (*a*), (2) invert, and (3) multiply (*a*). Following the inversion step, either the multiplier or the multiplicand will be a "0," and therefore the product of the contents of each register (*a*) and the accumulator register must also be "0." In a similar manner, each module in the array of modules may be set to the "1" state by the successive orders of (1) write (*a*), (2) invert, and (3) add (*a*). In view of the fact that either the addend or the augend must be "1," the sum registered in the accumulator register must be a "1."

Another instruction which may be utilized in the present computer is the "shift around" instruction. With this instruction, the module accumulator register in the lower left-hand corner of the array in FIG. 3 may be set to either of its two possible states. The information in this lower left-hand module is then transferred by a right shift operation to the adjacent module and a new binary signal is applied to the lower left-hand module. The lower right-hand module is coupled to the left-hand module of the second row from the bottom. Now, as successive right shift operations proceed with new information being entered on a bit-by-bit basis, binary information is shifted from the extreme right-hand modules to the extreme left-hand modules in the next higher row. Information supplied in this serial manner may thus be utilized to establish a pattern in the network of modules, instead of the usual procedure of supply input signals from the array of input cells 16.

In the foregoing description, the circuitry and order structure of the present distributed computer have been set forth. In connection with FIG. 2 of the drawing, the steps for identifying a particular portion of a pattern and for identifying the existence of this singular type of pattern were considered. In a similar manner, other more complicated patterns may be identified in arrays including many more than the 25 modules represented in FIG. 2. For particular example, the letters of the alphabet may be readily identified. This is accomplished by selecting singularities possessed by approximately one half of the letters of the alphabet, and then further subdividing each group. Eventually each letter may be identified individually. In a similar manner, the present computer may be readily adapted to solve other problems of a spatial or distributed nature.

In the foregoing description, the array of computer modules has been described as a rectangular array of modules in two dimensions. It is evident that the principles of the present invention are also applicable to arrays of modules having three dimensions, or more broadly to arrays of modules connected in accordance with mathematical concepts of *n*-dimensional space. The modules could also be arranged in a hexagonal array or in accordance with polar coordinates, for example, rather than in accordance with Cartesian coordinates. In addition, each module has been disclosed as including registers for storing single bits of information. It is to be understood, however, that larger individual storage registers may be associated with each module. Furthermore, the relatively simple logic performed at each module may be replaced by more complex logic circuits or arithmetic units of types known in the art.

It is to be understood that the above-described arrangements are illustrative of the application of the principles of the invention. Numerous other arrangements may be devised by those skilled in the art without departing from the spirit and scope of the invention.

What is claimed is:

1. A spatially oriented digital data information processing apparatus comprising a plurality of information sources arranged in a two-dimensional rectangular matrix array, a plurality of modular circuits arranged in one-to-one correspondence with said sources in a two-dimensional rectangular matrix array identical in configuration to that of said information sources, means respectively interconnecting said information sources and the correspondingly-positioned modular circuits, each of said modular circuits including interconnected logic circuit means and means for storing a plurality of digital information signals, said storing means including an accumulator register, direct electrical connections respectively interconnecting each modular circuit to the modular circuits which are immediately adjacent thereto in the horizontal direction and also to those which are immediately adjacent thereto in the vertical direction, link circuit means directly interconnecting adjacent ones of said modular circuits, said link circuit means including interconnected logic means and storage means, circuit means including said logic means interconnecting said storage means and the accumulator registers of the modular circuits connected to said link circuit means, and central control means coupled to the logic means of said link circuit means and directly connected to the logic circuit means of every one of said modular circuits for simultaneously applying to said logic circuit means identical control signals.

2. A spatially oriented computer comprising a plurality of information sources arranged in an *n*-dimensional spatial array, where *n* is at least two, a plurality of modular circuits arranged in one-to-one correspondence with said sources in an *n*-dimensional array identical in configuration to that of said information sources, means respectively interconnecting said information sources and the correspondingly-positioned modular circuits, electrical path means directly interconnecting adjacent ones of said modular circuits, link circuit means directly interconnecting adjacent ones of said modular circuits, and central control means coupled to said link circuit means and directly connected to every one of said modular circuits for simultaneously applying thereto identical control signals.

3. A spatially oriented digital data information processing system comprising a plurality of information sources arranged in an $n$-dimensional spatial array, where $n$ is at least two, a plurality of modular circuits arranged in one-to-one correspondence with said sources in an $n$-dimensional array identical in configuration to that of said information sources, each modular circuit including a register, and means respectively directly interconnecting said information sources and the correspondingly-positioned modular circuits, said interconnecting means including first control means for setting the registers of said modular circuits to a pattern of registration signals corresponding to the pattern of the output signals of said information sources, and second control means directly connected to every one of the modular circuits for shifting the pattern of signals registered therein in at least two different dimensions among the modular circuits in said array.

4. A spatially oriented computer comprising a plurality of information sources arranged in an $n$-dimensional spatial array, where $n$ is at least two, a plurality of modular circuits arranged in one-to-one correspondence with said sources in an $n$-dimensional array identical in configuration to that of said information sources, each of said modular circuits including an accumulator register, means respectively interconnecting said information sources and the correspondingly-positioned modular circuits, central control means directly connected to every one of said modular circuits for simultaneously applying thereto identical control signals, and means responsive to a predetermined variable storage condition of the accumulator registers of all of said modular circuits for directly applying a signal to said central control means.

5. A spatially oriented computer comprising a plurality of information sources arranged in an $n$-dimensional spatial array, where $n$ is at least two, a plurality of modular circuits arranged in one-to-one correspondence with said sources in an $n$-dimensional array identical in configuration to that of said information sources, means respectively interconnecting said information sources and the correspondingly-positioned modular circuits, electrical path means directly interconnecting adjacent ones of said modular circuits, and link circuit means directly interconnecting adjacent ones of said modular circuits.

6. A spatially oriented computer comprising a plurality of information sources arranged in an $n$-dimensional spatial array, where $n$ is at least two, a plurality of modular circuits arranged in one-to-one correspondence with said sources in an array identical in configuration to that of said information sources, means respectively interconnecting said information sources and the correspondingly-positioned modular circuits, and central control means directly connected to every one of said modular circuits for simultaneously applying thereto identical control signals.

7. In combination, a plurality of information sources arranged in a spatial array, where $n$ is at least two, an $n$-dimensional plurality of modular circuits arranged in one-to-one correspondence with said sources in an $n$-dimensional array identical in configuration to that of said information sources, means respectively interconnecting said information sources and the correspondingly-positioned modular circuits, each of said modular circuits including an accumulator register and at least one additional register, means directly connecting the accumulator register of each modular circuit to the accumulator registers of adjacent modular circuits, and means connected between the accumulator register and the additional register of each modular circuit for transferring digital information signals therebetween.

References Cited in the file of this patent

UNITED STATES PATENTS

| | | |
|---|---|---|
| 2,666,575 | Edwards | Jan. 19, 1954 |
| 2,700,504 | Thomas | Jan. 25, 1955 |
| 2,805,409 | Mader | Sept. 3, 1957 |
| 2,834,007 | Smith | May 6, 1958 |
| 2,840,801 | Beter et al. | June 24, 1958 |
| 2,968,791 | Johnson et al. | Jan. 17, 1961 |